(12) United States Patent
Hanayama

(10) Patent No.: US 10,506,121 B2
(45) Date of Patent: Dec. 10, 2019

(54) IMAGE-READING DEVICE

(71) Applicant: Brother Kogyo Kabushiki Kaisha, Nagoya-shi, Aichi-ken (JP)

(72) Inventor: Yukiyoshi Hanayama, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 136 days.

(21) Appl. No.: 15/199,203

(22) Filed: Jun. 30, 2016

(65) Prior Publication Data
US 2016/0316087 A1 Oct. 27, 2016

Related U.S. Application Data

(63) Continuation of application No. 13/626,562, filed on Sep. 25, 2012, now Pat. No. 9,413,904.

(30) Foreign Application Priority Data

Dec. 27, 2011 (JP) .................................. 2011-286379
Apr. 20, 2012 (JP) .................................. 2012-096788

(51) Int. Cl.
*H04N 1/00* (2006.01)
*H04N 5/04* (2006.01)

(52) U.S. Cl.
CPC ....... *H04N 1/00896* (2013.01); *H04N 1/0005* (2013.01); *H04N 1/00013* (2013.01);
(Continued)

(58) Field of Classification Search
CPC ............. H04N 1/0057; H04N 1/00588; H04N 1/00591; H04N 220/0077; H04N 1/0073
(Continued)

(56) References Cited

U.S. PATENT DOCUMENTS 4,743,132 A * 5/1988 Chikata .................. B41J 15/005
226/188
4,745,436 A * 5/1988 Matsuura ........... G03G 15/5004
355/75
(Continued)

FOREIGN PATENT DOCUMENTS

CN 101515976 A 8/2009
CN 101570087 A 11/2009
(Continued)

OTHER PUBLICATIONS

Non-final Office Action received in corresponding U.S. Appl. No. 13/626,562, dated Feb. 24, 2014.
(Continued)

*Primary Examiner* — Akwasi M Sarpong
(74) *Attorney, Agent, or Firm* — Banner & Witcoff, Ltd.

(57) ABSTRACT

An image-reading device is provided that includes a reading component configured to read a document, a document holding portion, a detector detecting a position of the document holding portion, a power supply device that supplies power to the reading component, and a power supply control device that controls power supplied by the power supply device to the reading component. The power supply control device determines whether a change in the position of the document holding portion has occurred based on the position of the document holding portion detected by the detector. When a change in position is detected and the image reading device is not performing document reading, the power supplied to the reading component is reduced. If a change in position is detected while the image reading device is performing document reading, the power supplied to the reading component is maintained.

14 Claims, 10 Drawing Sheets

(52) U.S. Cl.
CPC ..... *H04N 1/00037* (2013.01); *H04N 1/00082* (2013.01); *H04N 1/00525* (2013.01); *H04N 1/00535* (2013.01); *H04N 1/00904* (2013.01); *H04N 5/04* (2013.01); *H04N 1/00533* (2013.01); *H04N 2201/0081* (2013.01)

(58) Field of Classification Search
USPC ................................ 358/498, 474, 475, 1.15
See application file for complete search history.

(56) References Cited

U.S. PATENT DOCUMENTS

| | | | | |
|---|---|---|---|---|
| 5,570,160 A * | 10/1996 | Miwa | ................... | G03G 15/757 399/116 |
| 5,764,385 A * | 6/1998 | Ohyama | .............. | H04N 1/0057 358/496 |
| 5,900,950 A * | 5/1999 | Hsu | ........................ | H04N 1/00 358/474 |
| 6,316,767 B1 * | 11/2001 | Paxton | ..................... | H04N 1/00 250/214 AL |
| 6,882,822 B2 * | 4/2005 | Gomi | ................... | G03G 15/605 399/377 |
| 8,253,995 B2 * | 8/2012 | Mizutani | .............. | H04N 1/0057 271/258.01 |
| 9,330,672 B2 * | 5/2016 | Guan | ..................... | G10L 19/02 |
| 2005/0052680 A1 * | 3/2005 | Okamura | ........... | H04N 1/00551 358/1.14 |
| 2009/0010671 A1 | 1/2009 | Hashimoto | | |
| 2009/0185243 A1 * | 7/2009 | Mizutani | .............. | H04N 1/0057 358/498 |
| 2009/0207423 A1 | 8/2009 | Shimizu et al. | | |
| 2009/0276650 A1 | 11/2009 | Kuroda et al. | | |
| 2010/0259784 A1 * | 10/2010 | Tsuda | ................. | G03G 15/5004 358/1.15 |

FOREIGN PATENT DOCUMENTS

| | | |
|---|---|---|
| CN | 101859083 A | 10/2010 |
| JP | 09-304983 A | 11/1997 |
| JP | 2001-210003 A | 8/2001 |
| JP | 2001-309094 A | 11/2001 |
| JP | 2004-343271 A | 12/2004 |
| JP | 2004-357007 A | 12/2004 |
| JP | 2004-357023 A | 12/2004 |
| JP | 2004343271 A * | 12/2004 ............ B41J 15/005 |
| JP | 3868930 B2 | 1/2007 |
| JP | 4012116 B2 | 11/2007 |
| JP | 2009015649 A | 1/2009 |
| JP | 2011-073850 A | 4/2011 |
| JP | 2011-193113 A | 9/2011 |

OTHER PUBLICATIONS

Sep. 16, 2014—U.S. Final Office Action—U.S. Appl. No. 13/626,562.
Nov. 3, 2014—(CN) Office Action—App 201210549761.3—Eng Tran.
Jul. 9, 2015—U.S. Non-Final Office Action—U.S. Appl. No. 13/626,562.
Nov. 30, 2015—U.S.—Final Office Action—U.S. Appl. No. 13/626,562.
Apr. 8, 2016—U.S. Notice of Allowance—U.S. Appl. No. 13/626,562.
Feb. 14, 2017—(JP) Office Action—App 2016-095861—Eng Tran.

* cited by examiner

Fig.7

| | IMAGE READING UNIT | CONTROL DEVICE | OPERATING PANEL | EXTERNAL INTERFACE | SENSOR |
|---|---|---|---|---|---|
| READY MODE | SUPPLIED | SUPPLIED | SUPPLIED | SUPPLIED | SUPPLIED |
| FIRST POWER-SAVING MODE | NOT SUPPLIED | SUPPLIED | SUPPLIED | SUPPLIED | SUPPLIED |
| SECOND POWER-SAVING MODE | NOT SUPPLIED | NOT SUPPLIED | SUPPLIED | NOT SUPPLIED | SUPPLIED |

IMAGE-READING DEVICE

CROSS-REFERENCE TO RELATED APPLICATION

This application is a continuation application of prior U.S. application Ser. No. 13/626,562, filed Sep. 25, 2012, which claims priority from Japanese Patent Application No. 2011-286379, filed on Dec. 27, 2011 and Japanese Patent Application No. 2012-096788, filed on Apr. 20, 2012, which are incorporated herein by reference.

FIELD

The disclosure relates to an image-reading device that reads a document, and more specifically, to an image-reading device that controls power supply to reduce power consumed by reading components used for document reading.

BACKGROUND

In order to achieve power savings, a known image-reading device, for example, a scanner, is configured to enter a power saving mode to reduce power consumed by reading components used for document reading while the scanner is not in an operating condition.

A known scanner, as an example of an image-reading device that controls power, includes a retractable document mount that is capable of opening and closing with respect to a main body of the known scanner. The known scanner is configured to turn itself on or off in accordance with the opening or closing of the document mount.

SUMMARY

The known scanner is configured to turn itself on or off in accordance with opening or closing of the document mount. When the document mount is changed to an unused position during document reading, the known scanner turns itself off during the document reading and this may detrimentally influence image reading quality. The configuration in which turning on or off of power of the known scanner is controlled by the opening or closing of the document mount provides usability. Thus, the scanner not having such a configuration may reduce user convenience.

According to aspects of the disclosure, an image-reading device configured to control power supply and achieve image-reading quality and user convenience may be accomplished.

BRIEF DESCRIPTION OF THE DRAWINGS

For a more complete understanding of the present disclosure and the features and advantages thereof, reference now is made to the following descriptions taken in connection with the accompanying drawing.

FIG. 7 depicts a relationship between each mode and a condition of power supply to each component in the illustrative embodiment according to one or more aspects of the disclosure.

DETAILED DESCRIPTION

Hereinafter, an illustrative embodiment in which an image-reading device according to the aspects of the disclosure may be implemented is described in detail with reference to the accompanying drawings. In the illustrative embodiment, the aspects of the disclosure may be applied to a scanner that may have a power saving mode for reducing power consumption in the scanner.

Figure 1:
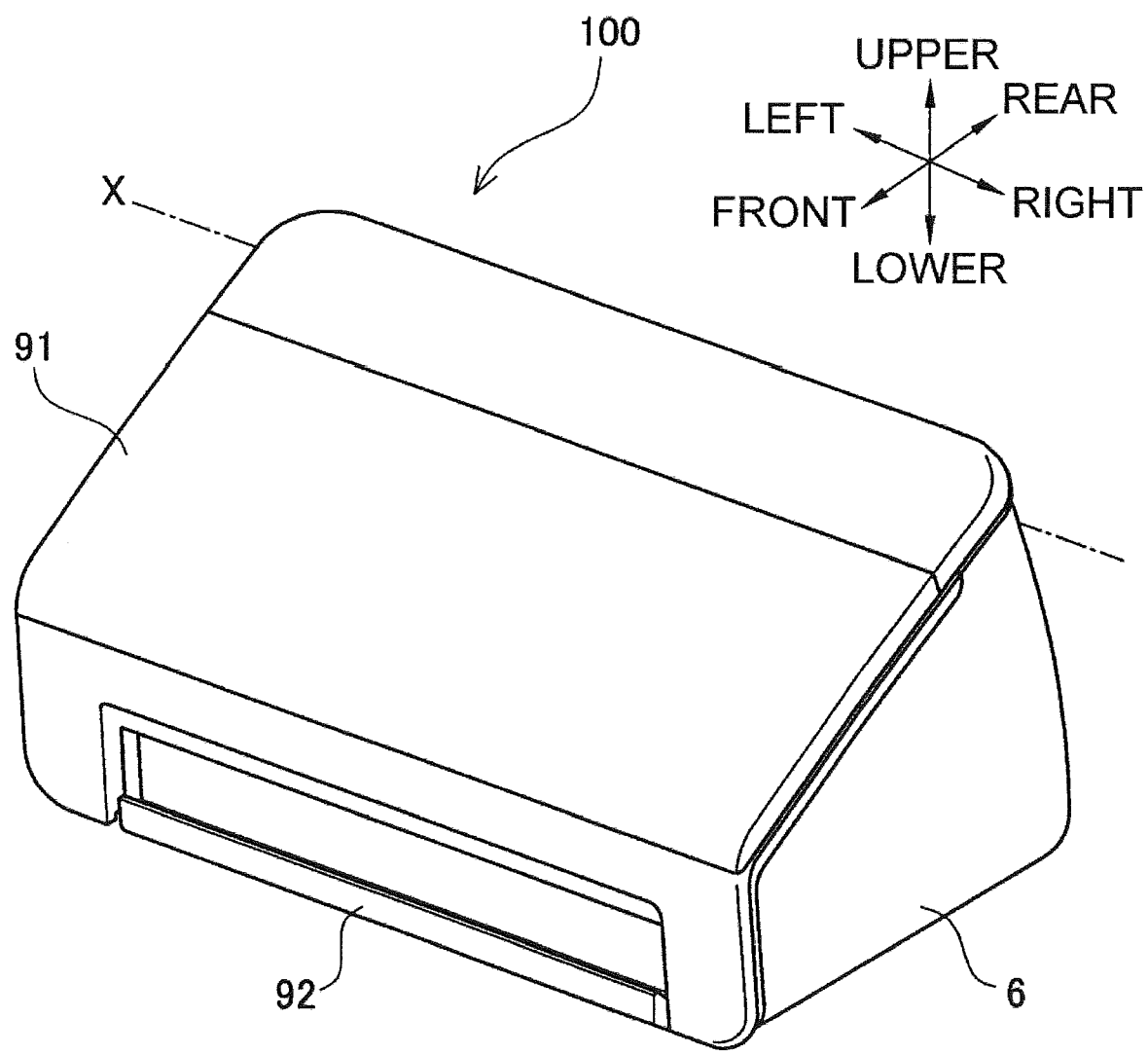
FIG. 1 depicts a scanner in an illustrative embodiment according to one or more aspects of the disclosure, wherein a document feed tray is closed.
Figure 2:
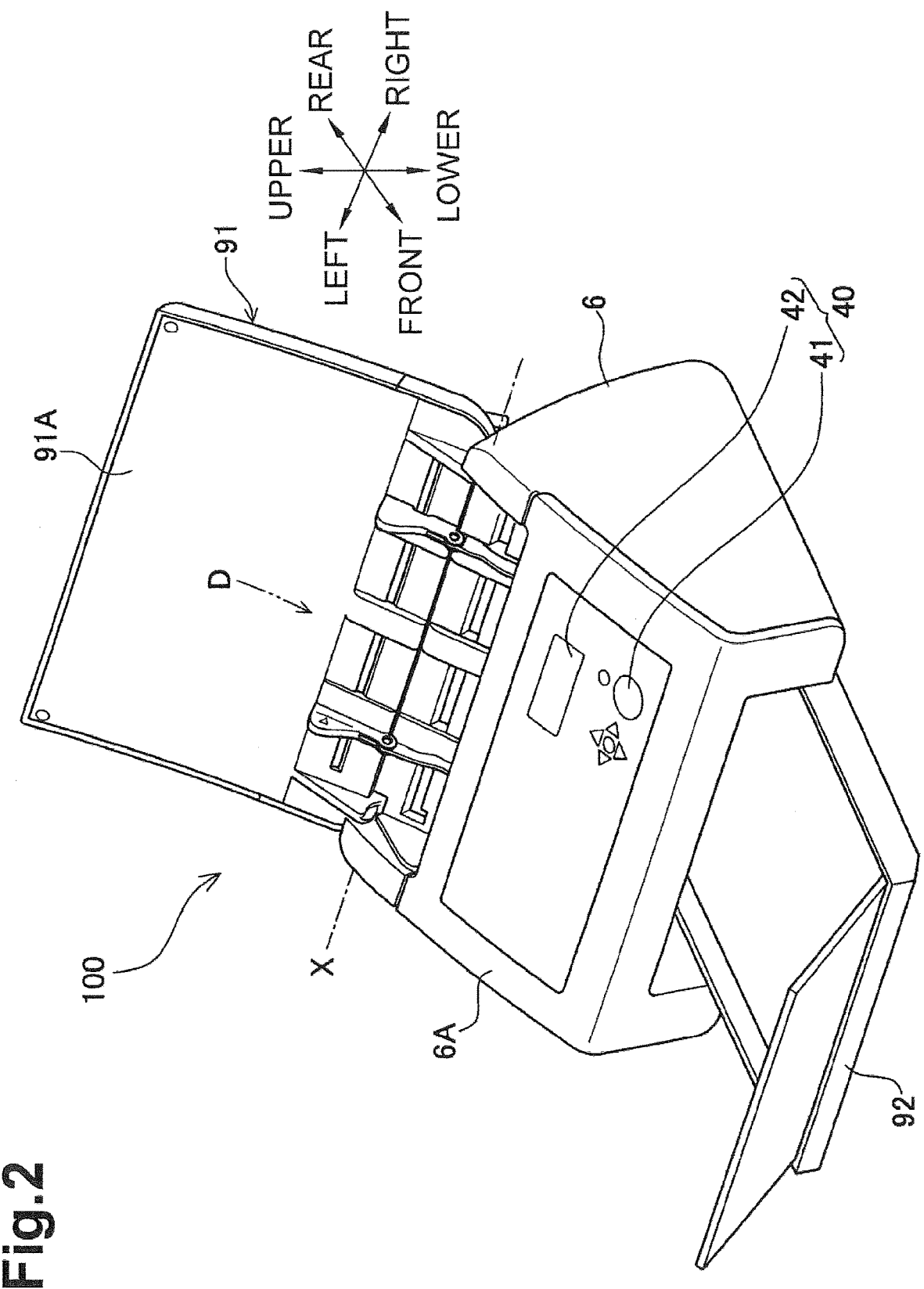
FIG. 2 depicts the scanner in the illustrative embodiment according to one or more aspects of the disclosure, wherein the document feed tray is opened.

As depicted in FIGS. 1 and 2, a scanner 100 may comprise a housing 6, a document holding portion such as a document feed tray 91, and a document discharge tray 92. Housing 6 may cover a main body of scanner 100. Document feed tray 91 may be configured to cover or uncover an upper surface 6A of housing 6 and be opened or closed with respect to scanner 100. Document discharge tray 92 may be disposed at a lower part of scanner 100. In FIG. 1, the side on which document discharge tray 92 may be disposed may be defined as the front of scanner 100. The right, left, front, and rear of scanner 100 may be defined when scanner 100 is disposed in an orientation in which it is intended to be used, and the defined directions may be applicable to the drawings of FIGS. 2-4.

Document feed tray 91 may be supported by housing 6 so as to be pivotable about a rotation axis X that may be located at a rearwardly upward position with respect to housing 6 to extend along a right-left direction. When document feed tray 91 is pivoted about rotation axis X to be opened from a position where document feed tray 91 may cover upper surface 6A as depicted in FIG. 1, document feed tray 91 may be changed to a position where document feed tray 91 may allow a document holding surface 91A to face upward at a rearward part of housing 6 as depicted in FIG. 2. In the illustrative embodiment, the position where document holding surface 91A may be exposed as depicted in FIG. 2 may be referred to as a "used position" of document feed tray 91 and the position where document holding surface 91A may not be exposed as depicted in FIG. 1 may be referred to as an "unused position" of document feed tray 91. In the used position, document feed tray 91 may be configured to hold one or more documents that have not been read yet. In the unused position, document feed tray 91 may be configured not to hold any documents because document feed tray 91 may not allow document holding surface 91A to appear in the unused position.

Document discharge tray 92 may be disposed at the lower part of housing 6 and may be configured to be inserted into or be drawn from housing 6 along a front-rear direction. As depicted in FIG. 2, document discharge tray 92 may be configured to be drawn forward with respect to housing 6. In the illustrative embodiment, the position where document discharge tray 92 may be drawn forward with respect to housing 6 as depicted in FIG. 2 may be referred to as a "used position" of document discharge tray 92 and the position where document discharge tray 92 may be accommodated in housing 6 as depicted in FIG. 1 may be referred to as an "unused position" of document discharge tray 92. Similar to document feed tray 91, in the used position, document discharge tray 92 may be configured to hold one or more documents that have been read. In the unused position, document discharge tray 92 may be configured not to hold any documents.

As depicted in FIG. 2, housing 6 may comprise an operating panel 40 that may comprise a keypad 41 and a display unit 42 at upper surface 6A. Keypad 41 may comprise various buttons (e.g., a start key, a stop key, and numeric keys). Display unit 42 may comprise a liquid crystal display. When document feed tray 91 is located in the unused position, input operations on operating panel 40 by a user may be limited because document feed tray 91 covers operating panel 40 (see FIG. 1). When document feed tray 91 is located in the used position, operating panel 40 may appear to allow all input operations by the user.

Figure 3:
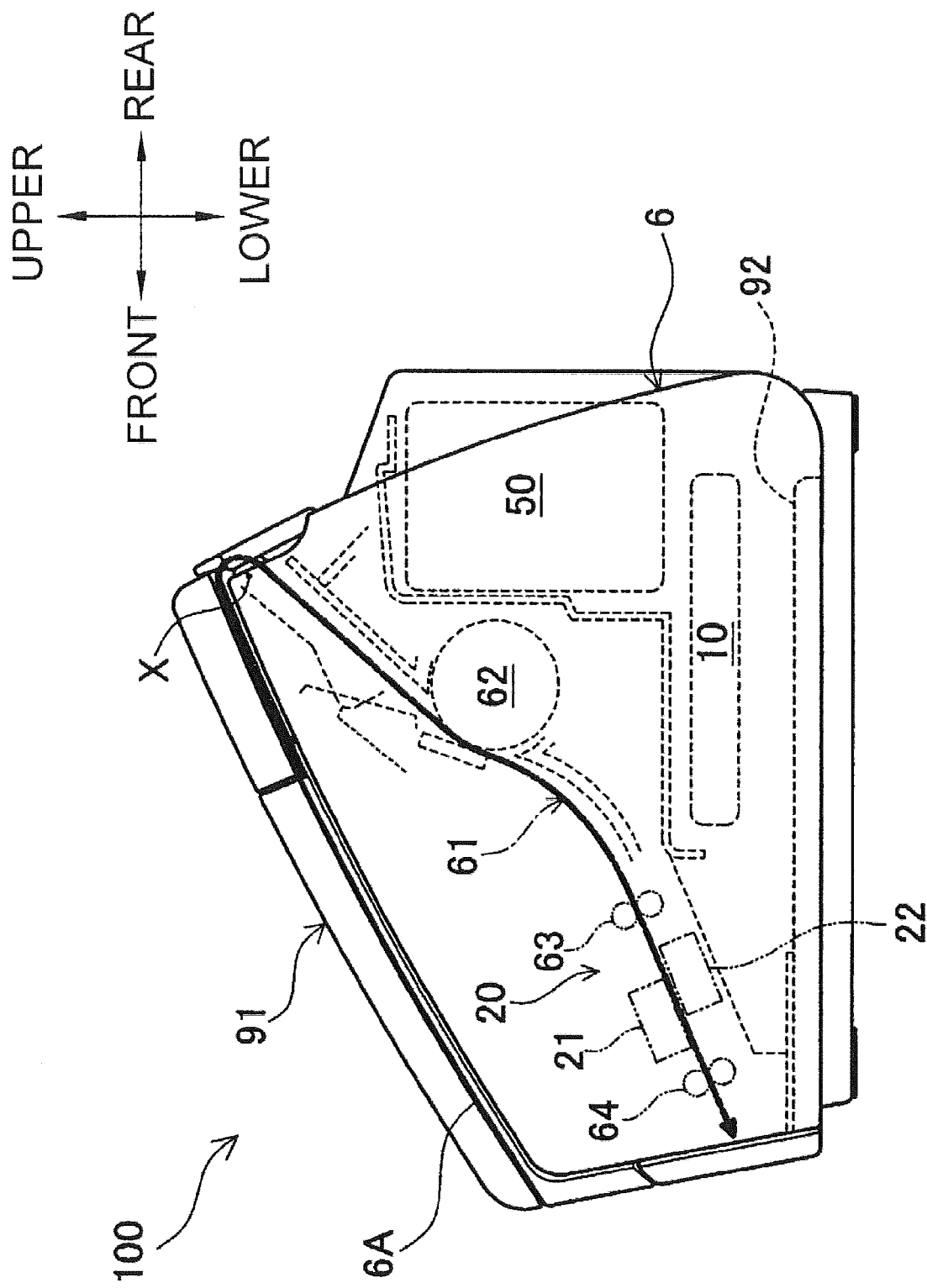
FIG. 3 depicts an internal configuration of the scanner of FIG. 1 in the illustrative embodiment according to one or more aspects of the disclosure.
Figure 4:
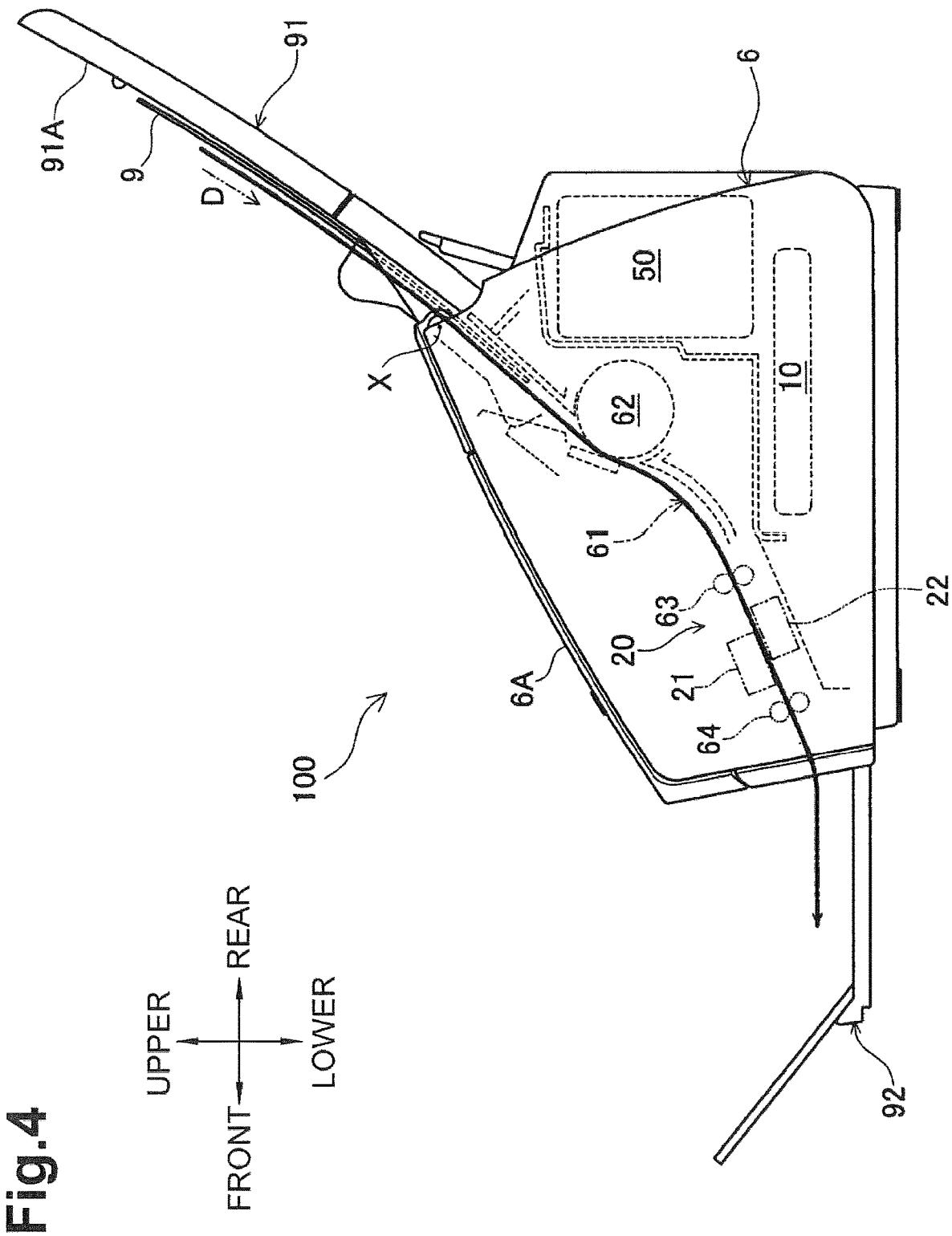
FIG. 4 depicts the internal configuration of the scanner of FIG. 2 in the illustrative embodiment according to one or more aspects of the disclosure.

FIGS. 3 and 4 depict an internal configuration of scanner 100. FIG. 3 depicts scanner 100 in which both the document feed tray 91 and document discharge tray 92 are located in their unused positions. FIG. 4 depicts scanner 100 in which document feed tray 91 and document discharge tray 9 are located in their used positions.

Scanner 100 may comprise a feed roller 62, a first conveyor roller 63, image sensors 21, 22, and a second conveyor roller 64 in its inside. In this illustrative embodiment, the reading components, for example, feed roller 62, first conveyor roller 63, image sensors 21, 22, and second conveyor roller 64, used for document reading may be collectively called an image reading unit 20. Image reading unit 20 may be configured to read a color image or read a monochrome image only.

One of image sensors 21, 22 may be configured to read an image on one side of a document and the other of image sensors 21, 22 may be configured to read an image on the other side of the document. In each of image sensors 21, 22, optical elements may be arranged in line along the right-left direction (a direction perpendicular to the drawing surface of FIG. 4). Each of image sensors 21, 22 may be configured to convert light reflected from the document into electronic signals and output the electronic signals. For example, a contact image sensor ("CIS") or a charge-coupled device ("CCD") may be employed as image sensors 21, 22.

Scanner 100 may convey one or more documents 9 held on document feed tray 91 along a direction indicated by an arrow D depicted in FIGS. 2 and 4 from document feed tray 91 to document discharge tray 92. More specifically, in scanner 100, document feed tray 91 may be located in the used position for setting one or more documents 9 on document feed tray 91. As depicted in FIG. 4, the user may set one or more documents 9 on document feed tray 91. The one or more documents 9 held on document feed tray 91 may move toward feed roller 62 by their own weight. Then, feed roller 62 may convey documents 9, one by one, downstream along a conveying path 61. Image reading unit 20 may read one or both sides of document 9 that is moving in conveying path 61 when document 9 passes image reading unit 20. After that, scanner 100 may discharge document 9 onto document discharge tray 92. That is, document feed tray 91 and document discharge tray 92 may constitute a part of conveying path 61.

As depicted in FIG. 3, in scanner 100, when document feed tray 91 is located in the unused position, conveying path 61 may be curved in a substantially U-shape manner at rotation axis X of document feed tray 91. Therefore, when document feed tray 91 is located in the unused position, scanner 100 may be configured to not perform document reading by image reading unit 20.

Scanner 100 may further comprise a control device 10 and a power supply control system 50 in its inside as well as image reading unit 20. Control device 10 may be configured to control image reading unit 20. Power supply control system 50 may be configured to control power supplied to each unit or component of scanner 100. Control device 10 and power supply control system 50 will be described in detail later.

Figure 5:
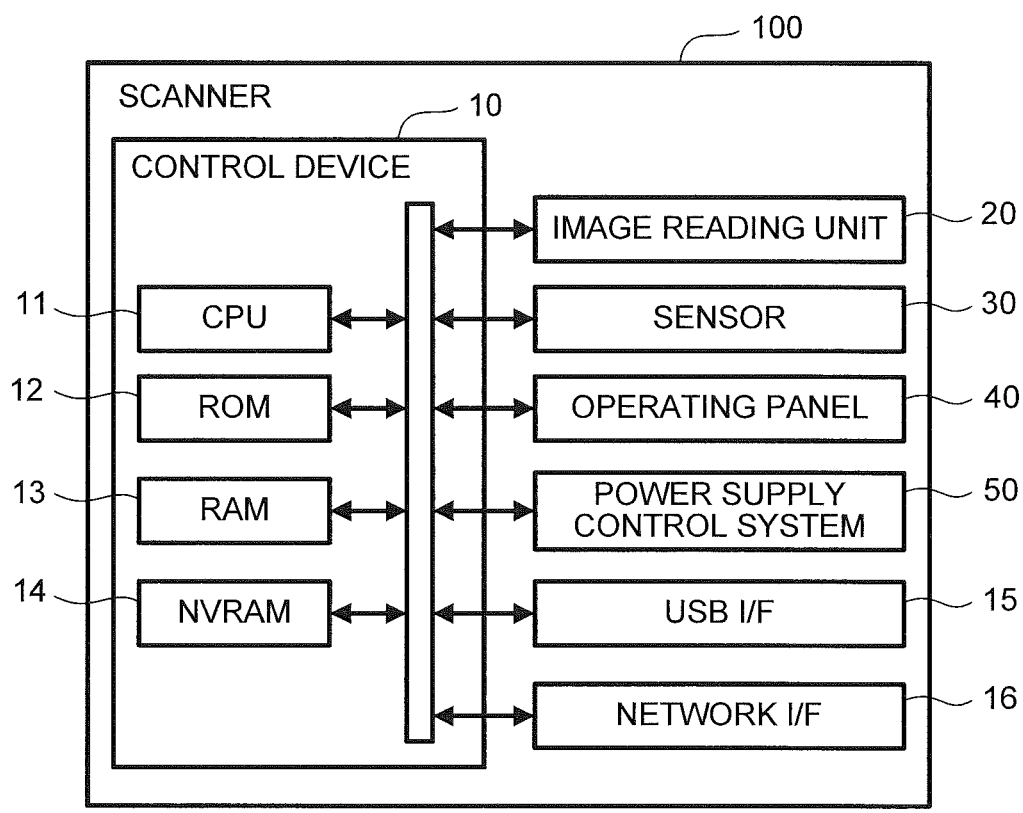
FIG. 5 is a block diagram depicting an electric configuration of the scanner in the illustrative embodiment according to one or more aspects of the disclosure.

An electric configuration of scanner 100 is now described. As depicted in FIG. 5, scanner 100 may comprise image reading unit 20, a detector such as sensor 30, operating panel 40, power supply control system 50, control device 10, a Universal Serial Bus ("USB") interface ("I/F") 15 and a network interface ("I/F") 16. Sensor 30 may be configured to detect the position of document feed tray 91 in the used position or in the unused position. Power supply control system 50 may be configured to control power supplied to each unit or component of scanner 100. Control device 10 may be configured to control operations of image reading unit 20. USB interface 15 and network interface 16 may be communication interfaces for establishing connections between scanner 100 and an output destination device, for example an external device.

Control device 10 may comprise a central processing unit ("CPU") 11, a read-only memory ("ROM") 12, a random-access memory ("RAM") 13, and a nonvolatile RAM ("NVRAM") 14. ROM 12 may store firmware that may control programs for controlling scanner 100 and various settings as well as certain setting values. RAM 13 may be used as a workspace for temporarily storing the control programs read from ROM 12 or as a storage area for temporarily storing image data.

A reading control device, for example CPU 11, may control functions of each unit or each component of scanner 100. CPU 11 may store processing results in RAM 13 or NVRAM 14, in accordance with the control programs read from ROM 13 and signals sent from sensors.

USB interface 15 may be configured to allow scanner 100 to communicate with the external device. For example, when an USB memory is connected to USB interface 15, scanner 100 may output read image data to the USB memory. USB interface 15 may not always be connected with the USB memory but also can be connected with, for example, a personal computer ("PC"). When USB interface 15 is connected with a PC, scanner 100 may be configured to receive various instructions, for example, a scanning instruction or a setting instruction, from the PC via USB interface 15.

Similar to USB interface 15, network interface 16 may be configured to allow scanner 100 to communicate with the external device. Scanner 100 may be configured to output read image data to an external device connected thereto via network interface 16. Scanner 100 may receive instructions from the external device via network interface 16.

The connection between scanner 100 and the external device may be established via other devices as well as USB interface 15 and network interface 16. For example, when scanner 100 comprises a wireless communication interface, scanner 100 may be connected with the external device via wireless communication.

Image reading unit 20 may be configured to read an image on a document and output the read image as image data, for example, in PDF format. Image reading unit 20 may be further configured to perform a correction process on the image data as required. Image reading unit 20 may output the image data to, for example, the external device that may be connected with scanner 100 via USB interface 15 or network interface 16.

Sensor 30 may be configured to output a signal identifying whether document feed tray 91 is in the used position (an opened state) or in the unused position (a closed state). Sensor 30 may comprise, for example, a light-emitting element and a light-receiving element. When document feed tray 91 is located in the used position, sensor 30 may be configured such that the light-receiving element may receive light from the light-emitting element. When document feed tray 91 is located in the unused position, sensor 30 may be configured such that the light-receiving element may not receive light from the light-emitting element due to an interruption.

Figure 6:
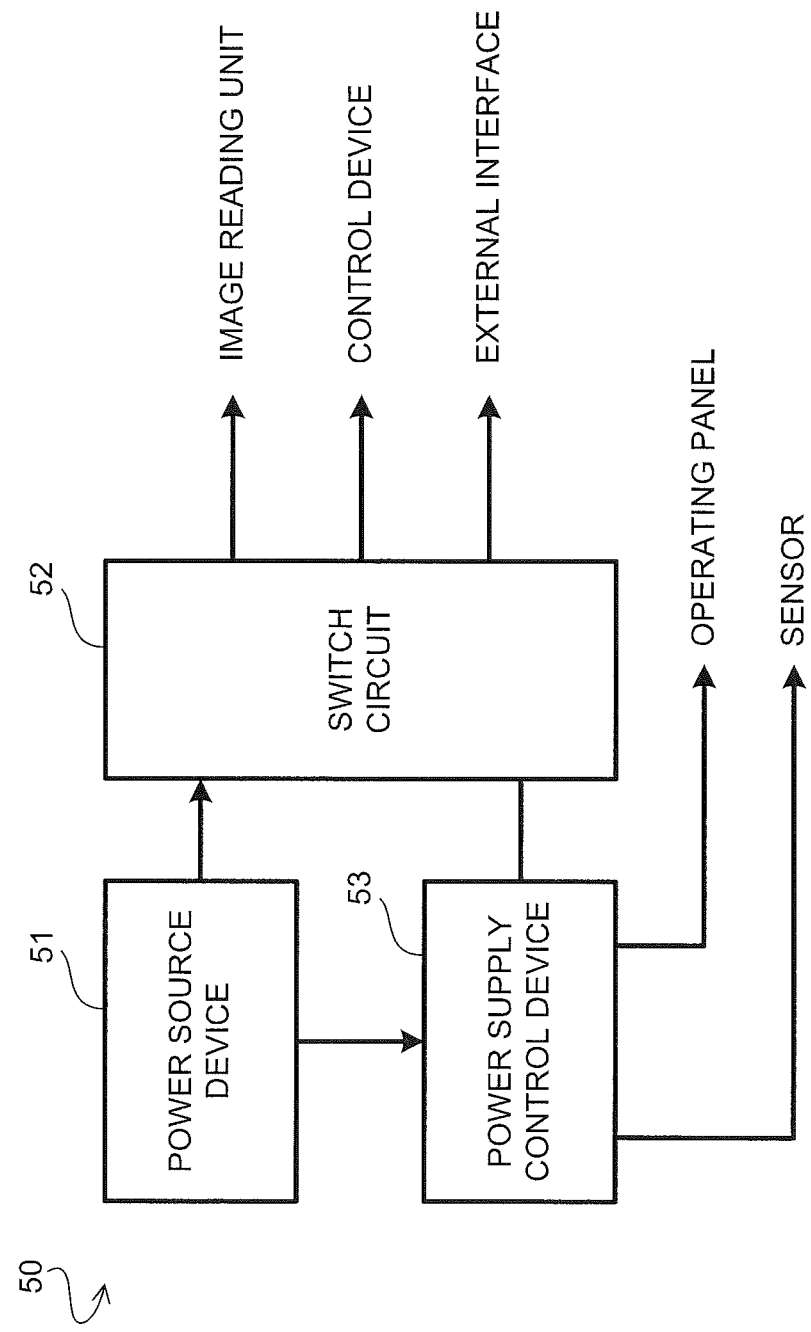
FIG. 6 is a perspective view depicting a power supply control system in the illustrative embodiment according to one or more aspects of the disclosure.

The power supply control performed in scanner 100 is described below. As depicted in FIG. 6, scanner 100 may comprise a power source device 51 (an example of a supply device), a switch circuit 52, and a power supply control device 53, collectively forming a power supply control system 50. Switch circuit 52 may be configured to distribute the power supplied from power source device 51 to each unit or each component of scanner 100. Power supply control device 53 may be configured to control making and breaking of each switch of switch circuit 52.

Power source device 51 may comprise a circuit that may be configured to be connected with, for example, a main electricity grid or a battery, and convert the power to an appropriate level to supply to each unit or each component of scanner 100. Switch circuit 52 may be configured to switch a power supply condition between supplying or not supplying power to each unit or each component of scanner 100 in accordance with a signal outputted from power supply control device 53. More specifically, scanner 100 may comprise a power source system for image reading unit 20, a power source system for control device 10, and a power source system for an external interface (for example, USB interface 15 and network interface 16 in this embodiment). Switch circuit 52 may be configured to switch the power supply condition between supplying or not supplying power to each power source system. Power source device 51 may supply power to sensor 30 and operating panel 40 all the time by bypassing switch circuit 52.

A plurality of power-supply modes are now described below. The plurality of power-supply modes may be realized by the switching of the power supply condition by switch circuit 52 between supplying or not supplying power to each power source system. The power-supply modes may include a power saving mode for reducing power consumed by one or more of image reading unit 20 and the other units and components, and a non-power saving mode for not reducing power consumed by image reading unit 20 and the other units and components.

More specifically, the non-power saving mode may include a ready mode. In the ready mode, scanner 100 may be allowed to perform image reading from a document and data transmission or reception and to receive user operations through operating panel 40. The power saving mode may include a first power-saving mode and a second power-saving mode. In the first power-saving mode, scanner 100 may be allowed to perform data transmission or reception via USB interface 15, network interface 16, or other interfaces and to receive user operations through operating panel 40 but may not be allowed to perform image reading from a document. In the second power-saving mode, scanner 100 may not be allowed to perform image reading from a document and data transmission or reception while operating panel 40, sensor 30, and power supply control system 50 may be allowed to operate.

FIG. 7 depicts a relationship between each mode and a condition of power supply to each unit or each component. In FIG. 7, "SUPPLIED" may represent that power is supplied to the unit or the component and "NOT SUPPLIED" may represent that power is not supplied to the unit or the component. As depicted in FIG. 7, in the ready mode, power is supplied to all of image reading unit 20, control device 10, operating panel 40, the external interface, and sensor 30, and scanner 100 may be allowed to perform a scanning operation. Immediately after scanner 100 is up, scanner 100 may operate in the ready mode. When a condition for shifting to the first power-saving mode is met during the ready mode, the mode may be changed to the first power-saving mode. When a condition for shifting to the second power-saving mode is met during the ready mode or during the first power-saving mode, the mode may be changed to the second power-saving mode.

In the first power-saving mode, switch circuit 52 may interrupt the power supply to image reading unit 20. That is, switch circuit 52 may interrupt the power supply to image sensors 21, 22, which may consume a larger amount of power, to reduce the power consumption in scanner 100. However, switch circuit 52 may not interrupt the power supply to control device 10, operating panel 40, and the external interface to receive user operations. When a condition for shifting to the ready mode is met, the mode may be changed to the ready mode.

In the second power-saving mode, switch circuit 20 may interrupt the power supply to control device 10 and the external interface in addition to image reading unit 20. That is, scanner 100 may not be allowed to perform data transmission or reception to or from the external device. This power supply control may further reduce the power consumption in scanner 100 as compared with the power consumption in scanner 100 in the first power-saving mode. However, switch circuit 20 may not interrupt the power supply to sensor 30. That is, sensor 30 may be controlled by a circuit different from control device 10, and thus, sensor 30 may be configured to detect the position of document feed tray 91 in the used position or in the unused position when scanner 100 is in the second power-saving mode. When document feed tray 91 is changed to the used position during the second power-saving mode, scanner 100 may determine that the document feed tray 91 has been changed from the unused position to the used position based on the detection result of sensor 30 and may shift to the ready mode. In the second power-saving mode, operating panel 40 may be supplied with power. That is, operating panel 40 may be controlled by a circuit different from control device 10 and may be configured to receive user operations when scanner 100 is in the second power-saving mode.

More specifically, power supply control device 53 may store a threshold time period (e.g., a waiting period) that may be a time at which the mode may be changed to the power saving mode. When the elapsed time measured by a timer exceeds the threshold time period since a time period during which the document reading may be performed has elapsed or a user operation (for example, an input through operating panel 40 or an instruction inputted from the external device) has been completed, the mode may be changed to the power saving mode. When document feed tray 91 is located in the used position at the time the elapsed time being measured exceeds the threshold time period, the mode may be changed to the first power-saving mode. When document feed tray 91 is located in the unused position at the time the elapsed time being measured exceeds the threshold time period, the mode may be changed to the second power-saving mode. After the mode is changed to the second power-saving mode, the timer may stop because the power supplied to control device 10 that can control the timer is interrupted.

Power supply control device 53 may be configured to output, to switch circuit 52, a signal for supplying or not supplying power to each power source system, in accordance with the current mode. Power supply control device 53 may be directly supplied with power from power source device 51 and configured to work while scanner 100 is in the second power-saving mode. Therefore, power supply control device 53 may control switch circuit 52 by monitoring an output signal from sensor 30 while scanner 100 is in the second power-saving mode.

A mode switching process for switching among the above-described modes is described with reference to FIG. 8. The mode switching process may be performed by power supply control device 53 when power source device 51 is connected to the main electricity grid or the battery and power is supplied to power supply control device 53 from power source device 51.

As the mode switching process starts, first, power supply control device 53 may operate in the ready mode in an initial state (step S101). It may be expected that scanner 100 will probably be used immediately after scanner 100 is up. Therefore, the mode may preferably be the ready mode immediately after scanner 100 is up.

After step S101, power supply control device 53 may start the timer to measure time (step S102). The time being measured by the timer may be used for a mode switching determination. The measured time of the timer may be reset to an initial value when document reading is started. The timer may stop measuring time during document reading, and the timer may restart measuring time when the document reading is completed. The measured time of the timer may be reset to the initial value when control device 10 detects a user operation through operating panel 40 or receipt of a signal from the external device.

Then, power supply control device 53 may determine whether communication is available between scanner 100 and an external device (step S151). The external device may be the USB memory connectable to scanner 100 via USB interface 15 or the PC connectable to scanner 100 via network interface 16.

When communication is available between scanner 100 and an external device (step S151: YES), power supply control device 53 may specify a time period T1 (for example, 15 minutes) as the threshold time period for shifting to the power saving mode (step S152). When communication is not available between scanner 100 and an external device (step S151: NO), power supply control device 53 may specify a time period T2 (for example, 3 minutes) as the threshold time period to further reduce the power consumption in scanner 100 (step S153). Time period T2 may be shorter than time period T1. After step S152 or step S153, the routine may move to step S103.

Then, power supply control device 53 may determine whether document feed tray 91 has been changed from the used position to the unused position (step S103). Power supply control device 53 may determine the position of document feed tray 91 based on the output signal sent from sensor 30. In step S103, when sensor 30 detects the position change of document feed tray 91 from the used position to the unused position, power supply control device 53 may make a positive determination (step S103: YES). From then on, power supply control device 53 may not make the positive determination in step S103 until sensor 30 detects again the position change of document feed tray 91 from the used position to the unused position.

When document feed tray 91 has been changed from the used position to the unused position (step S103: YES), power supply control device 53 may determine whether the elapsed time measured by the timer has exceeded the threshold time period (step S104). When the elapsed time measured by the timer has exceeded the threshold time period (step S104: YES), power supply control device 53 may perform a second power-saving mode executing process by shifting to the second power-saving mode (step S105).

Figure 9:
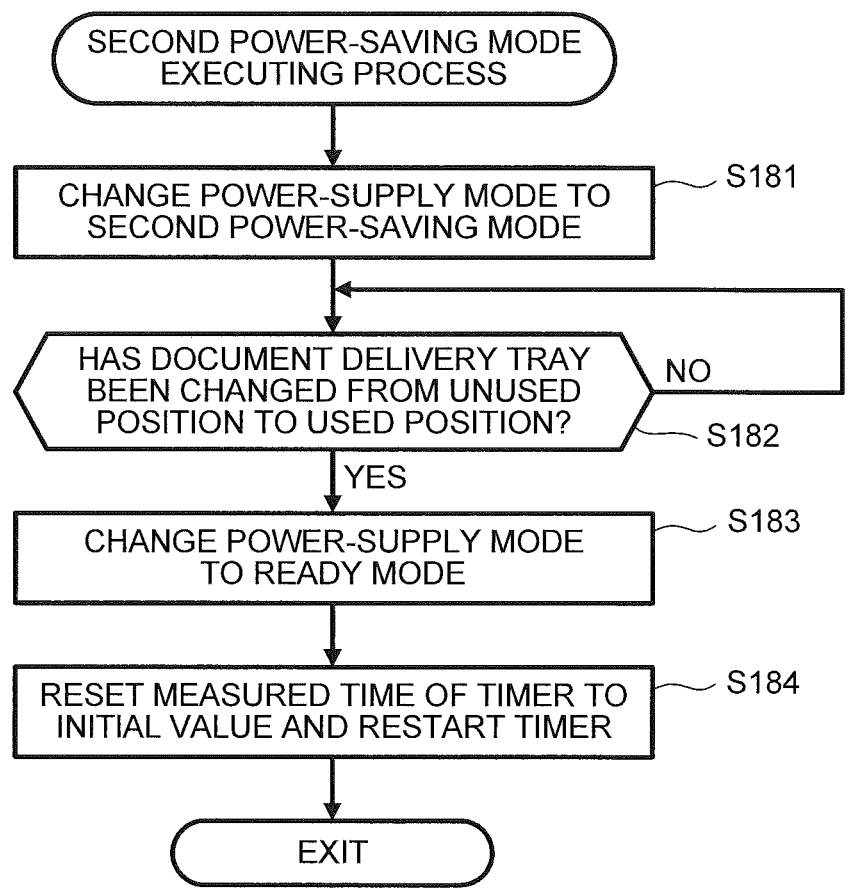
FIG. 9 is a flowchart depicting a second power-saving mode executing process in the illustrative embodiment according to one or more aspects of the disclosure.

FIG. 9 depicts details of the second power-saving mode executing process in step S105. In the second power-saving mode executing process, first, power supply control device 53 may change the mode to the second power-saving mode (step S181). In step S181, power supply control device 53 may output the signal for supplying or not supplying power to each power source system with respect to switch circuit 52 to control switch circuit 52 for changing the power-supply mode. This may be realized by the switching of the power supply condition by switching switch circuit 52 between supplying and not supplying power to each power source system in the second power-saving mode. That is, when document feed tray 91 is located in the unused position, the user may not be allowed to operate operating panel 40 or to set one or more documents 9 on document feed tray 91. Therefore, it may be conceivable that the user may not intend to use scanner 100. Thus, power supply control device 53 may change the mode to the second power-saving mode for more effectively reducing the power consumption in scanner 100.

Then, power supply control device 53 may determine whether document feed tray 91 has been changed from the unused position to the used position based on the output signal from sensor 30 (step S182). While document feed tray 91 is located in the unused position (step S182: NO), the routine may wait until document feed tray 91 is changed from the unused position to the used position.

When document feed tray 91 has been changed to the used position (step S182: YES), power supply control device 53 may change the mode to the ready mode (step S183). In step S183, power supply control device 53 may output the signal for supplying or not supplying power to each power source system with respect to switch circuit 52 to control switch circuit 52 for changing the power-supply mode. This may be realized by the switching of the power supply condition by switch circuit 52 between supplying and not supplying power to each power source system in the ready mode, because it may be conceivable that the user will use scanner 100. Then, power supply control device 53 may reset the measured time of the timer to the initial value and restart the timer to measure time (step S184). After step S184, power supply control device 53 may exit the second power-saving mode executing process.

Figure 8:
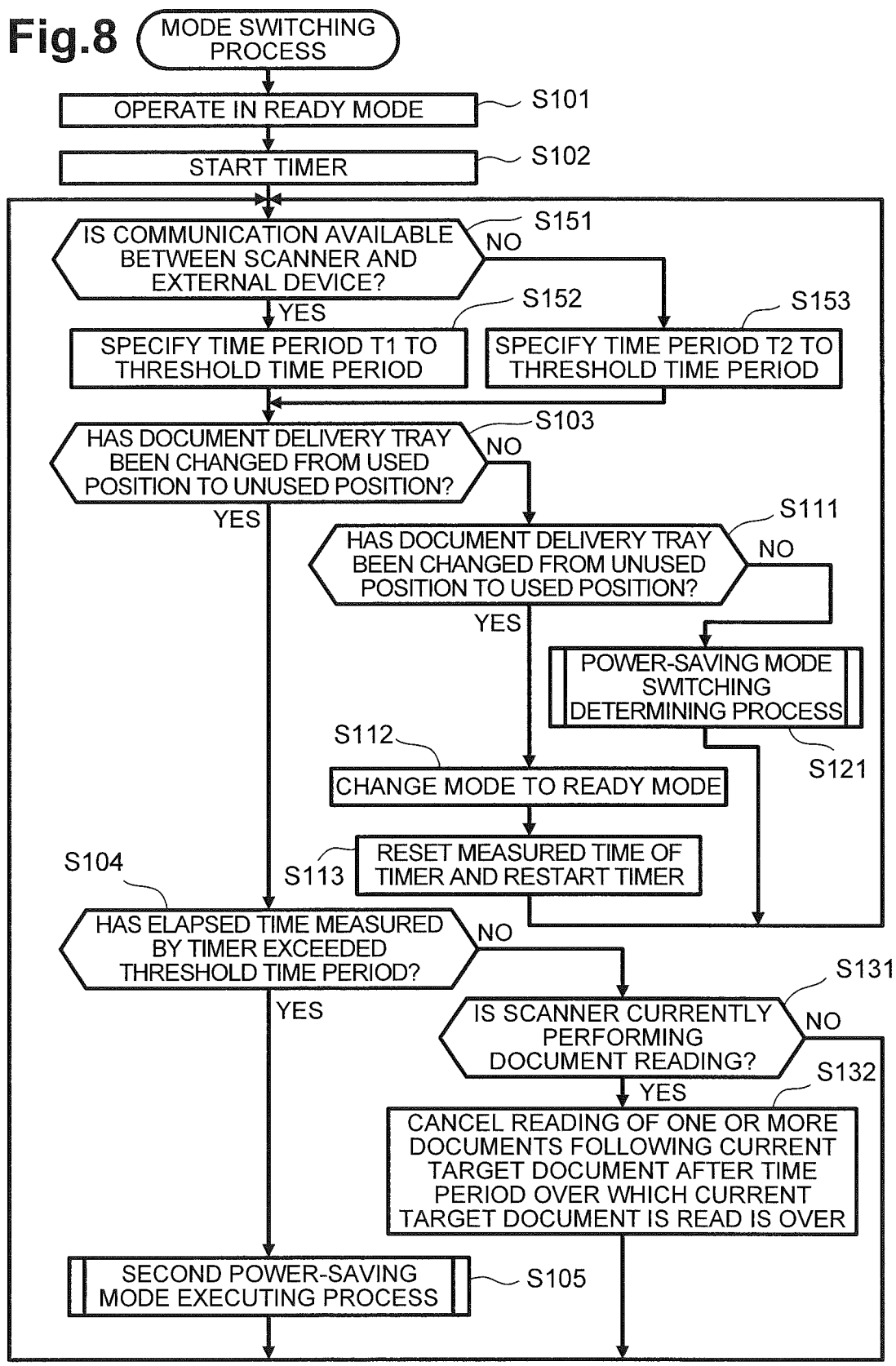
FIG. 8 is a flowchart depicting a mode switching process in the illustrative embodiment according to one or more aspects of the disclosure.

Back to the mode switching process of FIG. 8, after performing the second power-saving mode executing process in step S105, the routine may move to step S151.

When the elapsed time measured by the timer has not exceeded the threshold time period (step S104: NO), power supply control device 53 may determine whether scanner 100 is currently performing document reading (step S131). The measured time of the timer may be reset when document reading is started and the timer may stop measuring time during document reading. Therefore, the elapsed time measured by the timer does not exceed the threshold time period when scanner 100 is currently performing document reading. Thus, the case where the elapsed time measured by the timer has not exceeded the threshold time period may include a case where scanner 100 is currently performing document reading and a case where the elapsed time has not exceeded the threshold time period since the document reading was completed.

When scanner 100 is currently performing document reading (step S131: YES), power supply control device 53 may cancel the reading of one or more documents following the current target document after a time period during which the current target document is read is over (step S132). That is, when scanner 100 stops the current document reading in the middle of reading the current target document, scanner 100 may not obtain completely-read image data. Even when scanner 100 restarts the reading of the current target document, the quality of an image may be degraded due to variations in the reading speed. Accordingly, scanner 100 may continue the reading of the document being currently read to complete the reading of the current target document. However, scanner 100 may not perform reading of any documents following the current target document because a problem may arise during the conveyance of the following documents. After the completion of step S132, the current document reading is completed. Therefore, power supply control device 53 may restart the timer, which has stopped, to measure time. After step S132 or when scanner 100 is not currently performing the document reading (step S131: NO), the routine may move to step S151.

Back to step S103, when document feed tray 91 has not been changed from the used position to the unused position (step S103: NO), power supply control device 53 may determine whether document feed tray 91 has been changed from the unused position to the used position (step S111). In step S111, when sensor 30 detects the position change of document feed tray 91 from the unused position to the used position, power supply control device 53 may make a positive determination (step S111: YES). From then on, power supply control device 53 may not make the positive determination until sensor 30 detects the position change of document feed tray 91 from the unused position to the used position.

When document feed tray 91 has been changed from the unused position to the used position (step S111: YES), power supply control device 53 may change to the ready mode (step S112). In step S112, power supply control device 53 may output the signal for supplying or not supplying power to each power source system with respect to switch circuit 52 to control switch circuit 52 for changing the power-supply mode. This may be realized by switching the power supply condition by switch circuit 52 between supplying and not supplying power to each power source system in the ready mode. That is, power supply control device 53 may control switch circuit 52 to supply power to each unit or each component of scanner 100 and thus scanner 100 may be allowed to perform document reading. When scanner 100 is in the ready mode at the time of the position change of document feed tray 91 from the unused position to the used position, power supply control device 53 may not need to perform step S112. After step S112, power supply control device 53 may reset the measured time of the timer to the initial value and restart the timer to measure time (step S113). After step S113, the routine may move to step S151.

When document feed tray 91 has not been changed from the unused position to the used position (step S111: NO), power supply control device 53 may perform a power saving mode switching process for determining whether an automatic mode change to the first or second power-saving mode is performed (step S121).

Figure 10:
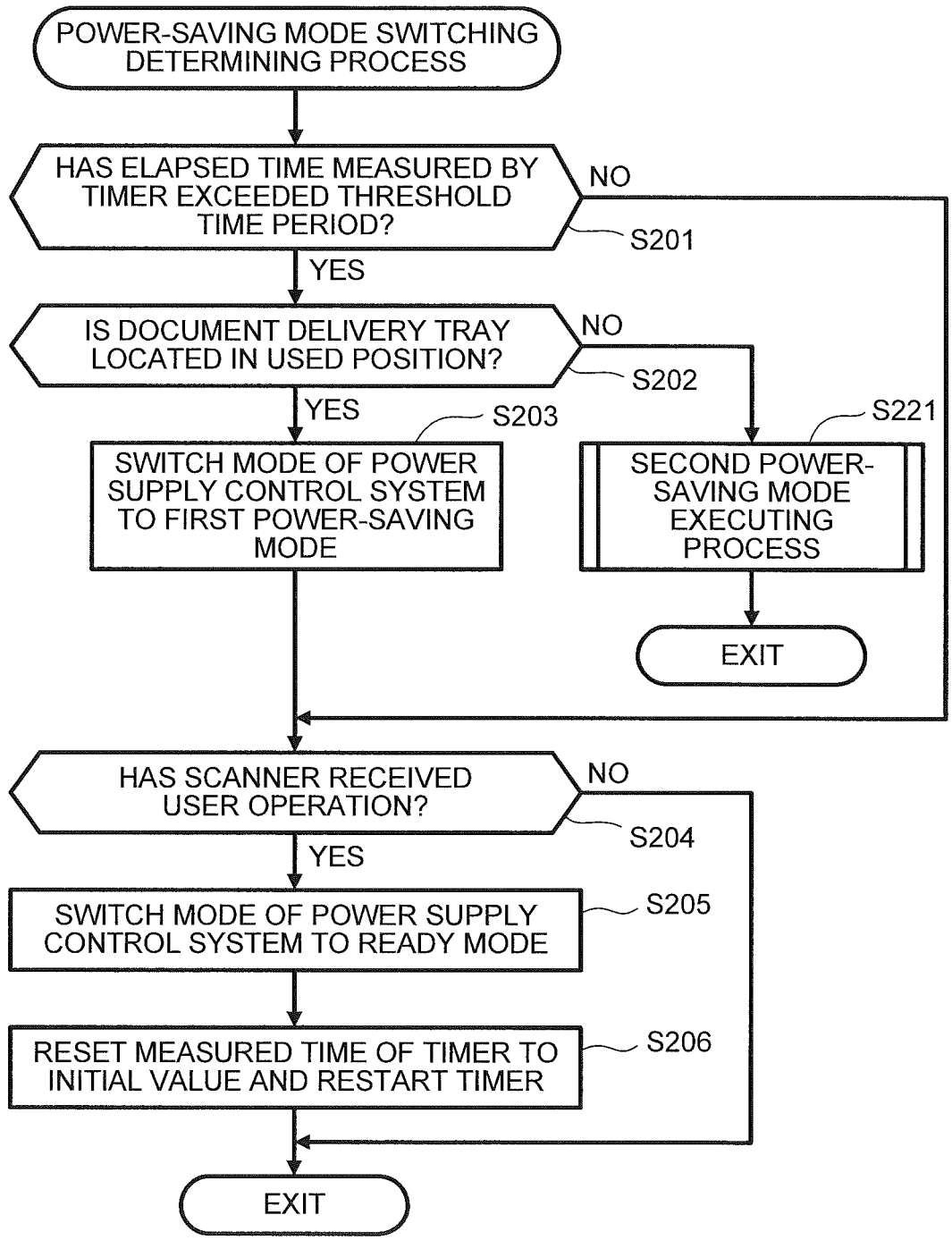
FIG. 10 is a flowchart depicting a power saving mode switching process in the illustrative embodiment according to one or more aspects of the disclosure.

FIG. 10 depicts details of the power saving mode switching process in step S121. In the power saving mode switching process, first, power supply control device 53 may determine whether the elapsed time measured by the timer has exceeded the threshold time period (step S201). When the elapsed time measured by the timer has exceeded the threshold time period (step S201: YES), power supply control device 53 may determine whether document feed tray 91 is located in the used position (step S202).

When document feed tray 91 is located in the used position (step S202: YES), power supply control device 53 may change the mode to the first power-saving mode (step S203). In step S203, power supply control device 53 may output the signal for supplying or not supplying power to each power source system with respect to switch circuit 52 to control switch circuit 52 for changing the power-supply mode. This may be realized by switching the power supply condition by switch circuit 52 between supplying and not supplying power to each power source system in the first power-saving mode. In the first power-saving mode, power supply control system 50 may control switch circuit 52 to stop supplying power to image reading unit 20 while continuing to supply power to operating panel 40, the external interface, and control device 10 that may control operating panel 40 and the external interface. Therefore, in the first power-saving mode, scanner 100 may be allowed to receive an input through operating panel 40 or an input from the external device. When scanner 100 has already been in the first power-saving mode at the time of step S203, power supply control device 53 may not need to perform step S203.

When document feed tray 91 is located in the unused position (step S202: NO), power supply control device 53 may perform the second power-saving mode executing process (step S221). In the second power-saving mode, power supply control system 50 may control switch circuit 52 to stop supplying power to image reading unit 20, the external interface, and control device 10 that may control operating panel 40 and the external interface. Therefore, in the second power-saving mode, scanner 100 may not be allowed to receive an input from the external device. The processing of step S221 may be the same as the processing of step S105. After completing step S221, power supply control device 53 may exit the power saving mode switching process.

After step S203 or when the elapsed time measured by the timer has not exceeded the threshold time period (step S201: NO), power supply control device 53 may determine whether scanner 100 has received a user operation (step S204). The user operation to scanner 100 may be, for example, an input operation on operating panel 40, an issue of a scanning instruction from the PC, or an access to data from the PC. When scanner 100 has not received a user operation (step S204: NO), power supply control device 53 may exit the power saving mode switching process.

When scanner 100 has received a user operation (step S204: YES), power supply control device 53 may change the mode to the ready mode (step S205). In step S205, power supply control device 53 may output the signal for supplying or not supplying power to each power source system with respect to switch circuit 52 to control switch circuit 52 for changing the power-supply mode. This may be realized by the switching of the power supply condition by switch circuit 52 between supplying and not supplying power to each power source system in the ready mode for performing processing corresponding to the user operation. That is, power supply control system 50 may control switch circuit 52 to supply power to each unit or each component of scanner 100 and this scanner 100 may be allowed to perform document reading. When scanner 100 has already been in the ready mode at the time of step S205, power supply control device 53 may not need to perform step S205. After step S205, power supply control device 53 may reset the measured time of the timer to the initial value and restart the timer to measure time (step S206). After step S206, power supply control device 53 may exit the power saving mode switching process.

Back to the mode switching process of FIG. 8, after performing the power saving mode switching process of step S121, the routine may move to step S151.

As described above, in scanner 100 according to the illustrative embodiment, while scanner 100 does not perform reading of a document 9, the user convenience may be ensured by the mode change to the power saving mode (in particular, the second power-saving mode in this illustrative embodiment) performed in accordance with the position change of document feed tray 91 from the used position to the unused position document 9. When document feed tray 91 is changed from the used position to the unused position during document reading, the mode may not be changed to the first power-saving mode or the second power-saving mode while at least reading of the current target document is performed. By doing so, the currently-performed reading may be completed and thus the degradation in the image quality may be reduced. Accordingly, scanner 100 according to the illustrative embodiment may achieve image-reading quality and the user convenience.

While various aspects of the disclosure has been described in detail with reference to the specific illustrative embodiments thereof, it would be apparent to those skilled in the art that various changes, arrangements and modifications may be applied therein without departing from the spirit and scope of the invention. For example, the image-reading device may not be limited to the scanner but may be applied to any devices having a reading function, for example, multifunction peripheral devices or facsimile machines.

In the above-described illustrative embodiment, the mode may be changed to the first or second power-saving mode on condition that document feed tray 91 is located in the used position or in the unused position, respectively. The condition may not be limited to the specific illustrative embodiment. In other illustrative embodiments, for example, the mode may be changed to the first or second power-saving mode on condition that document discharge tray 92 is located in the used position or in the unused position, respectively. That is, in the above-described illustrative embodiment, the power supply may be controlled in accordance with the position (the used position or the unused position) of document feed tray 91. Nevertheless, in other illustrative embodiments, for example, the power supply may be controlled in accordance with the position (the user position or the unused position) of document discharge tray 92.

In the above-described illustrative embodiment, there may be three modes, for example, the ready mode, the first power-saving mode, and the second power-saving mode. Nevertheless, in other illustrative embodiments, for example, the mode may be changed between two modes, for example, the ready mode and the second power-saving mode (or the first power-saving mode). There may be other modes (for example, a third power-saving mode in which power supply control system 50 may control switch circuit 52 to stop supplying power to the external interface while continuing the power supply to control device 10 for a duration of the mode shifting from the first power-saving mode to the second power-saving mode).

In the above-described illustrative embodiment, power source device 51 may supply power to operating panel 40 at all times. Nevertheless, in other illustrative embodiments, for example, power supply control system 50 may control switch circuit 52 to stop supplying power to operating panel 40 in the second power-saving mode.

In the above-described illustrative embodiment, when document feed tray 91 is located in the unused position (step S103: YES), power supply control device 53 may change the mode to the second power-saving mode after the elapsed time measured by the timer exceeds the threshold time period (step S104: YES). However, it may be unnecessary to wait at all times until the elapsed time measured by the timer exceeds the threshold time period. In other illustrative embodiments, for example, power supply control device 53 may change the mode to the second power-saving mode immediately after document feed tray 91 is changed from the used position to the unused position (or immediately after document reading is completed when scanner 100 is performing the document reading). The immediate mode change to the second power-saving mode after the position change of document feed tray 91 from the used position to the unused position may achieve further power savings.

In the above-described illustrative embodiment, power supply control device 53 may change the threshold time period based on whether communication is available between scanner 100 and an external device. Nevertheless, in other illustrative embodiments, for example, the threshold time period may not change.

In the above-described illustrative embodiment, when document feed tray 91 is changed from the used position to the unused position, scanner 100 may continue the reading of the document being read. Nevertheless, in other illustrative embodiments, for example, scanner 100 may be configured to perform reading of all of the following documents placed on document feed tray 91 when document feed tray 91 is changed to the unused position. However, the following documents may be damaged because it may be difficult to convey the documents from document feed tray 91 that may be located in the unused position. Accordingly, it may be preferable to complete the reading of the current target document only and not to perform reading of the following documents.

In the above-described illustrative embodiment, the threshold time period for shifting to the first power-saving mode and the threshold time period for shifting to the second power-saving mode may be commonly used. Nevertheless, in other illustrative embodiments, for example, these threshold time periods may be individually specified. In this case, for example, the threshold time periods may be individually specified based on whether communication is available between scanner 100 and an external device.

In the above-described illustrative embodiment, when scanner 100 is in the first power-saving mode, power supply control device 53 may control switch circuit 52 to stop supplying power to image reading unit 20 to reduce the power consumption in scanner 100. Nevertheless, in other illustrative embodiments, for example, power supply control device 53 may decrease the power supplied to image reading unit 20 to reduce the power consumption in scanner 100, instead of stopping the power supply. In the above-described illustrative embodiment, when scanner 100 is in the second power-saving mode, power supply control device 53 may control switch circuit 52 to stop supplying power to control device 10 and the external interface in addition to image reading unit 20. Similarly, power supply control device 53 may decrease the power supplied to at least one of image reading unit 20, control device 10, and the external interface to reduce the power consumption in scanner 100.

While the disclosure has included various example structures and illustrative embodiments, it will be understood by those skilled in the art that other variations and modifications of the structures and embodiments described above may be made without departing from the scope of the disclosure. Other structures and embodiments will be apparent to those skilled in the art from a consideration of the specification or practice of the embodiments disclosed herein. It is intended that the specification and the described examples are illustrative.

What is claimed is:

1. An image-reading apparatus, comprising:
   a housing;
   a roller configured to convey a document along a conveying path;
   a contact image sensor configured to read the document while the document is conveyed along the conveying path by the roller;
   a document feed tray connected to the housing pivotally, wherein the document feed tray is pivotable between an opened position and a closed position;
   a position sensor configured to output a signal identifying a position of the document feed tray;
   a power supply device electrically connected to the contact image sensor and the position sensor, the power supply device being configured to supply power to the contact image sensor and the position sensor when the image-reading apparatus is in a ready mode, an amount of power supplied from the power supply device in the ready mode being a first amount of power, the power supply device being configured to supply power to the position sensor when the image-reading apparatus is in a power saving mode, an amount of power supplied from the power supply device in the power saving mode being a second amount of power, the first amount of power being larger than the second amount of power; and
   a controller configured to:
      at the time the position of the document feed tray, identified by the signal from the position sensor, changes from the opened position to the closed position in a state where the contact image sensor is reading the document, control a power-supply mode of the image-reading apparatus not to be changed from the ready mode to the power saving mode until reading of the document by the contact image sensor is completed; and
      after reading of the document by the contact image sensor is completed, control the power-supply mode to be changed from the ready mode to the power saving mode.

2. The image-reading apparatus according to claim 1, wherein the controller is configured to control the power supply mode of the image-reading apparatus to be changed from the ready mode to the power saving mode since reading of the document by the contact image sensor is completed, when a predetermined time period has elapsed.

3. The image-reading apparatus according to claim 1, wherein the controller is further configured to:
   change the power supply mode of the image-reading apparatus from the ready mode to the power saving mode when the contact image sensor is not reading and the roller is not conveying.

4. The image-reading apparatus according to claim 1, wherein the controller is configured to:
   change the power-supply mode of the image-reading apparatus from the ready mode to the power saving mode by stopping the supply of power to the contact image sensor.

5. The image-reading apparatus according to claim 2, wherein the controller is further configured to:
   reset a timer at the time the position of the document feed tray, identified by the signal from the position sensor, changes from the closed position to the opened position and the predetermined time period has not elapsed.

6. The image-reading apparatus according to claim 5, wherein, the controller is further configured to:
   change the power-supply mode of the image-reading apparatus from the ready mode to the power saving mode when the predetermined time period has elapsed since the timer was reset.

7. The image-reading apparatus according to claim 1 further comprises:
   an external interface configured to communicate with an external device, the power supply device electrically connected to the external interface, the power supply device being configured to supply power to the contact image sensor, the position sensor, and the external interface when the image-reading apparatus is in the ready mode, the power supply device being configured to supply power to the position sensor when the image-reading apparatus is in the power saving mode,
   wherein the controller is further configured to:
      at the time the position of the document feed tray, identified by the signal from the position sensor, changes from the opened position to the closed position in a state where the contact image sensor is reading the document, control the power-supply mode of the image-reading apparatus not to be changed from the ready mode to the power saving mode so as to allow communication with the external device to continue via the external interface until reading of the document by the contact image sensor is completed; and
      after reading of the document by the contact image sensor is completed, control the power-supply mode to be changed from the ready mode to the power saving mode so as to cause communication with the external device to be discontinued via the external interface.

8. The image-reading apparatus according to claim 1 further comprises:
an operating panel provided on the housing,
wherein the power supply device is electrically connected to the operating panel and is configured to supply power to the contact image sensor, the position sensor, and the operating panel when the image-reading apparatus is in the ready mode, the power supply device being configured to supply power to the position sensor when the image-reading apparatus is in the power saving mode, and
wherein the controller is further configured to control the power supply device to:
at the time the position of the document feed tray, identified by the signal from the position sensor, changes from the opened position to the closed position in the state where the contact image sensor is reading the document, control the power-supply mode of the image-reading apparatus not to be changed from the ready mode to the power saving mode until reading of the document by the contact image sensor is completed; and
after reading of the document by the contact image sensor is completed, control the power-supply mode to change from the ready mode to the power saving mode.

9. An image-reading apparatus, comprising:
a housing;
a roller configured to convey a document along a conveying path;
a contact image sensor configured to read the conveyed document;
a document feed tray connected to the housing pivotally, wherein the document feed tray is pivotable between a first position and a second position;
a light sensor configured to output a signal identifying a position of the document feed tray;
an external interface configured to communicate with an external device, wherein the external interface is wired or wireless; and
a controller configured to:
allow communication with the external device via the external interface to continue when the position of the document feed tray, identified by the signal from the light sensor, has changed from the first position to the second position in a state where the contact image sensor is reading the document and the roller is conveying the document; and
cause communication with the external device via the external interface to be discontinued when the position of the document feed tray, identified by the signal from the light sensor, has changed from the first position to the second position after last performing document reading.

10. The image-reading apparatus according to claim 9, wherein the allowing the communication to continue comprises causing the communication with the external device via the external interface to continue when the position of the document feed tray, identified by the signal from the light sensor, has changed from the first position to the second position and since last performing document reading, a predetermined time period has elapsed.

11. The image-reading apparatus according to claim 9, wherein the controller is further configured to:
cause communication with the external device via the external interface to be discontinued when the position of the document feed tray, identified by the signal from the light sensor, has changed from the first position to the second position and when the contact image sensor is not reading and the roller is not conveying.

12. The image-reading apparatus according to claim 9, wherein the causing communication with the external device via the external interface to be discontinued comprises stopping supply of power to the external interface.

13. The image-reading apparatus according to claim 10, wherein the controller is further configured to:
reset a timer when the position of the document feed tray has changed from the second position to the first position and the predetermined time period has not elapsed.

14. The image-reading apparatus according to claim 13, wherein, the controller is further configured to:
cause communication with the external device via the external interface to be discontinued when the predetermined time period has elapsed since the timer was reset.

* * * * *